Figure 1:
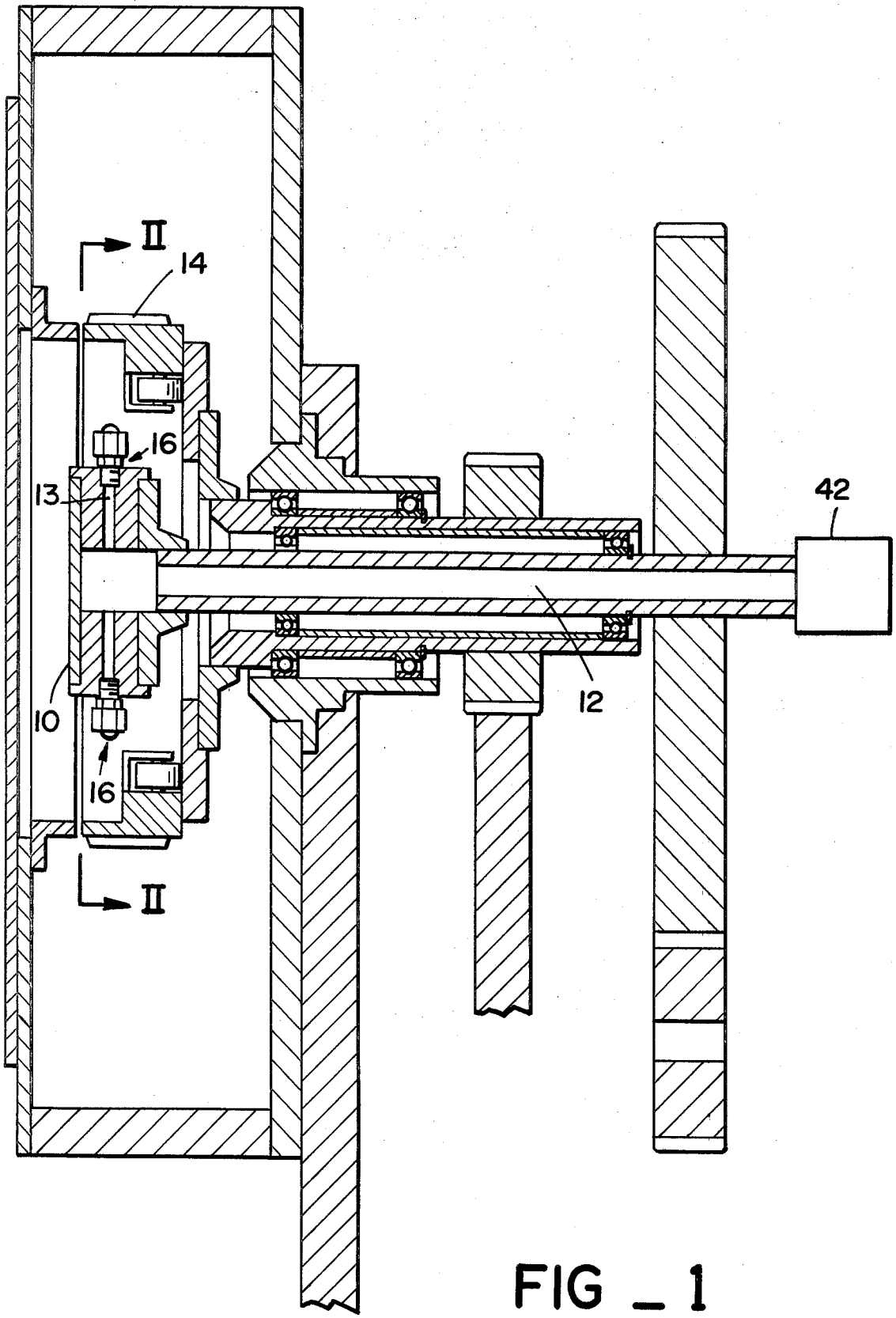
Figure 2:
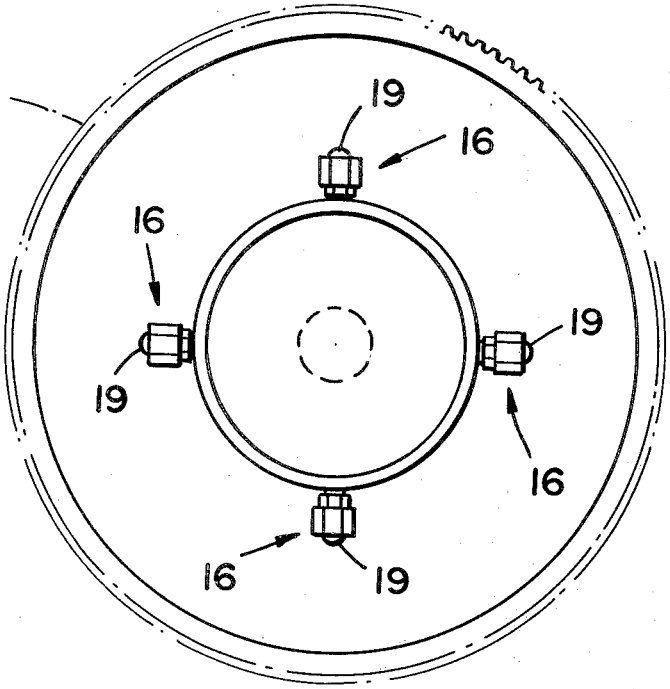
Figure 3:
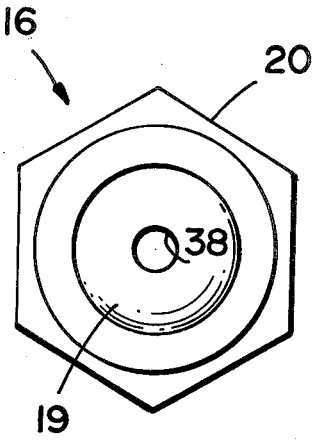
Figure 5:
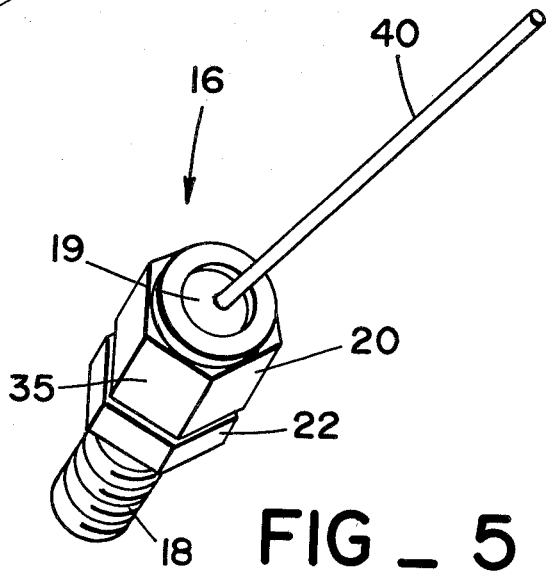
Figure 4:
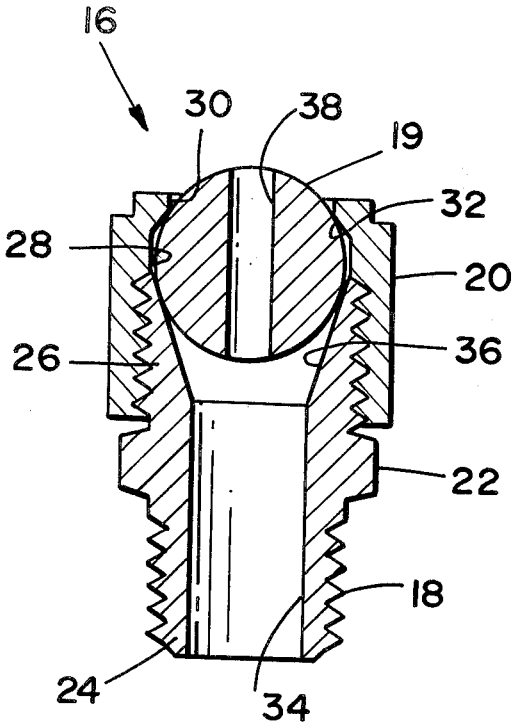
Figure 6:
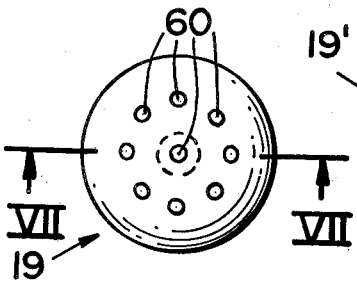
Figure 7:
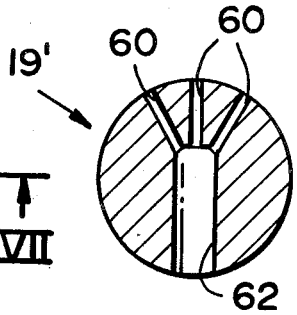

United States Defensive Publication [19] (H) [11] T971,002

Mitchell [43] June 6, 1978

[54] ADJUSTABLE NOZZLE

[75] Inventor: Thomas L. Mitchell, Washington, Ill.

[73] Assignee: Caterpillar Tractor Co., Peoria, Ill.

[21] Appl. No.: 666,735

[22] Filed: Mar. 15, 1976

[51] Int. Cl.[2] ..... F01M 9/00

[52] U.S. Cl. ..... 184/6.14

[57] ABSTRACT

In a system including a first member and a second member movable relative the first member, an adjustable nozzle element is included. The nozzle directs pressurized fluid such as a lubricant or coolant delivered to the first member outwardly in a range of possible directions to impact the second member.

13 Claims, 2 Sheets Drawing,

14 Pages Specification

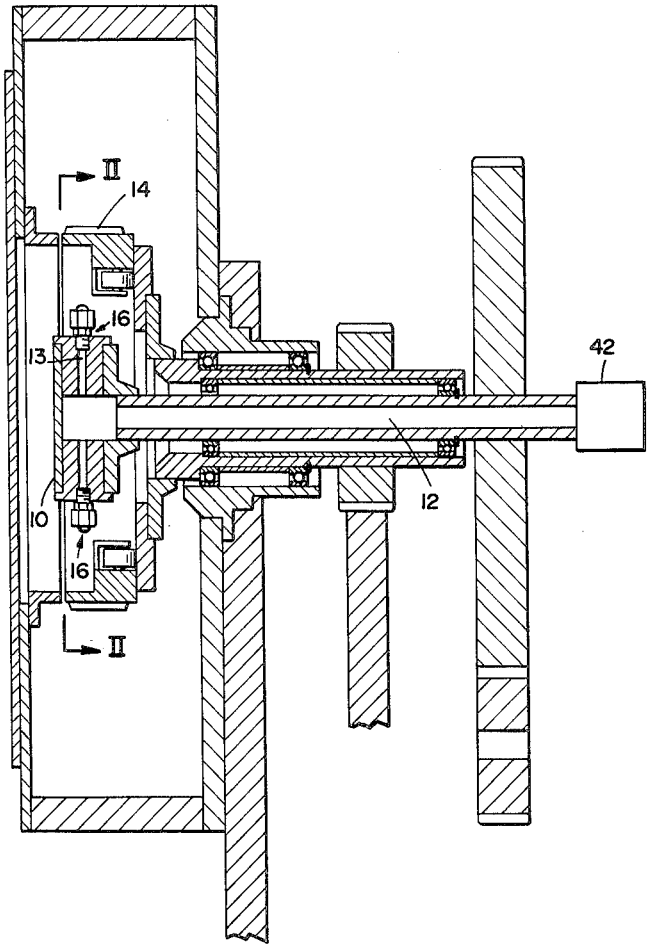

The file of this unexamined application may be inspected and copies thereof may be purchased (849 O.G. 1221, Apr. 9, 1968).